May 22, 1934.   E. J. SWEETLAND   1,959,695
DISPENSING APPARATUS
Filed Dec. 9, 1929   6 Sheets-Sheet 1
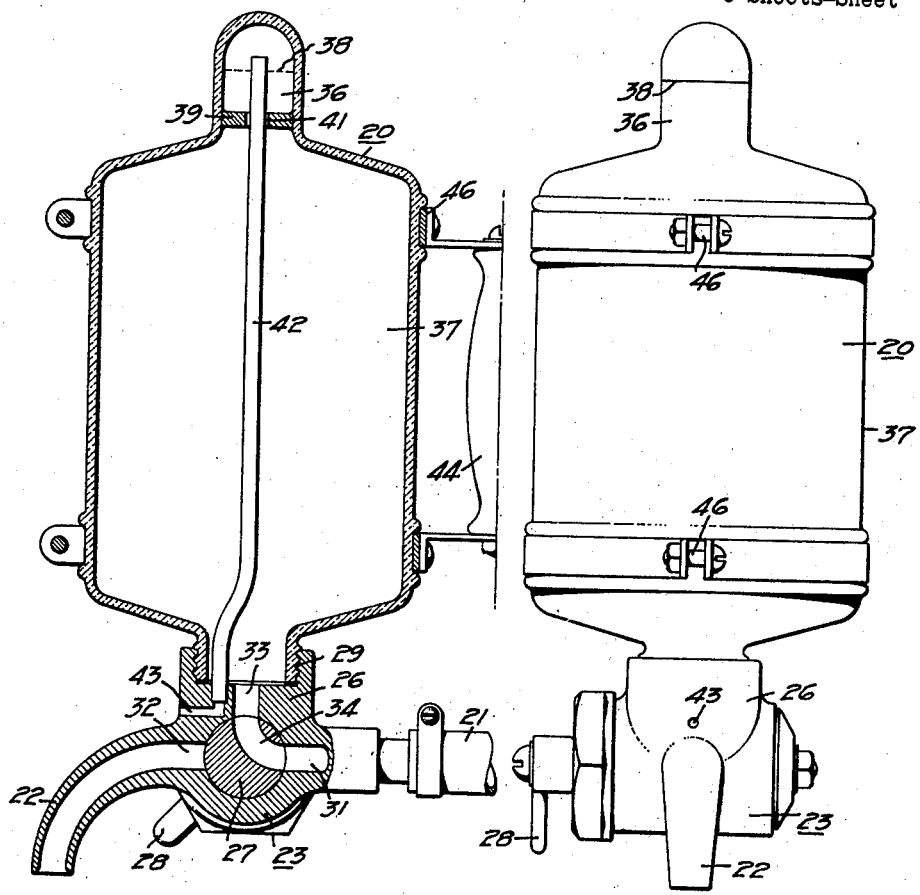
FIG.1.                                    FIG.2.
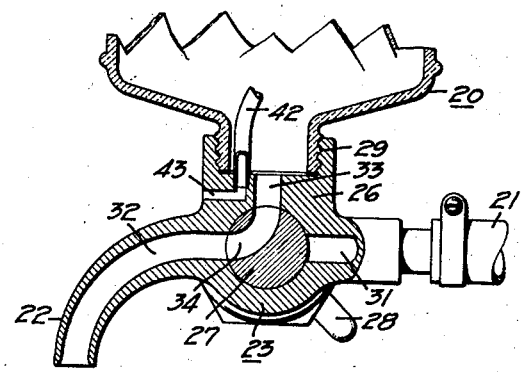
FIG.3.
INVENTOR.
Ernest J. Sweetland
BY
White, Prost, Hehw & Lothrop
ATTORNEYS.

May 22, 1934.  E. J. SWEETLAND  1,959,695
DISPENSING APPARATUS
Filed Dec. 9, 1929  6 Sheets-Sheet 2
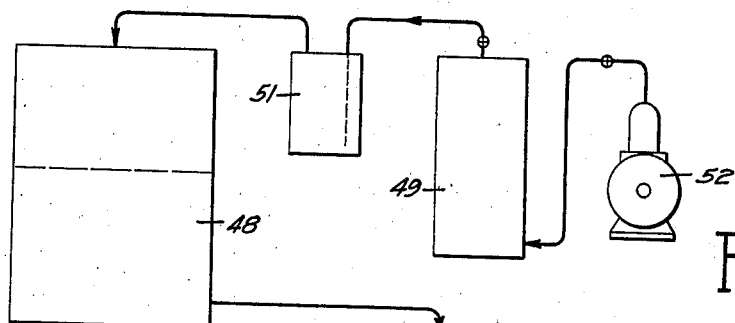
FIG_4_
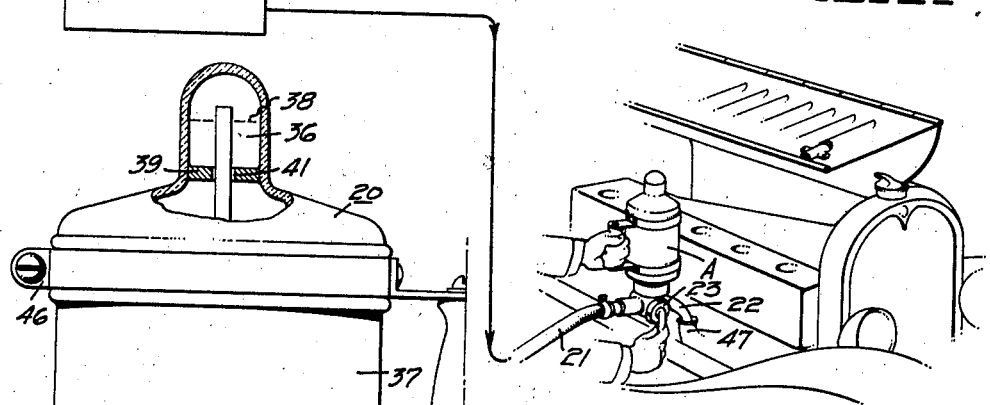
FIG_7_
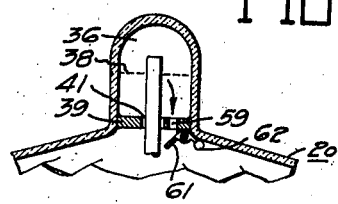
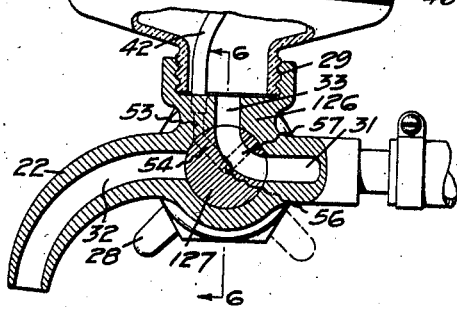
FIG_5_
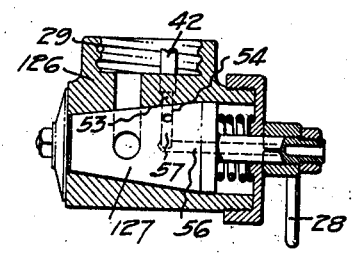
FIG_6_
INVENTOR.
Ernest J. Sweetland
BY
White, Prost, Elehr & Lothrop
ATTORNEYS.

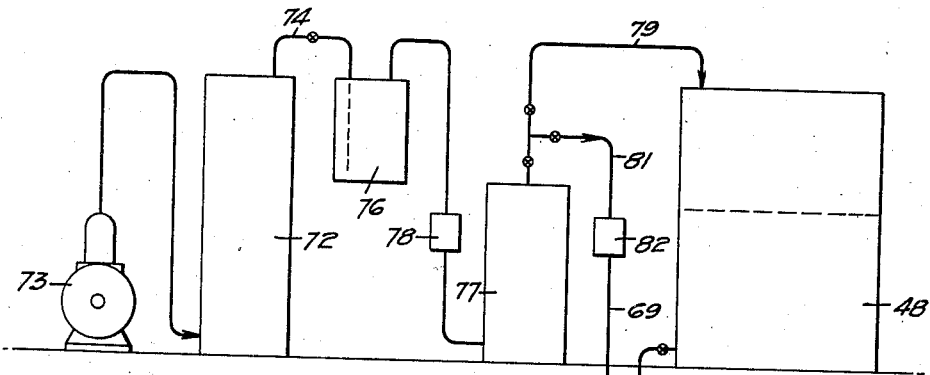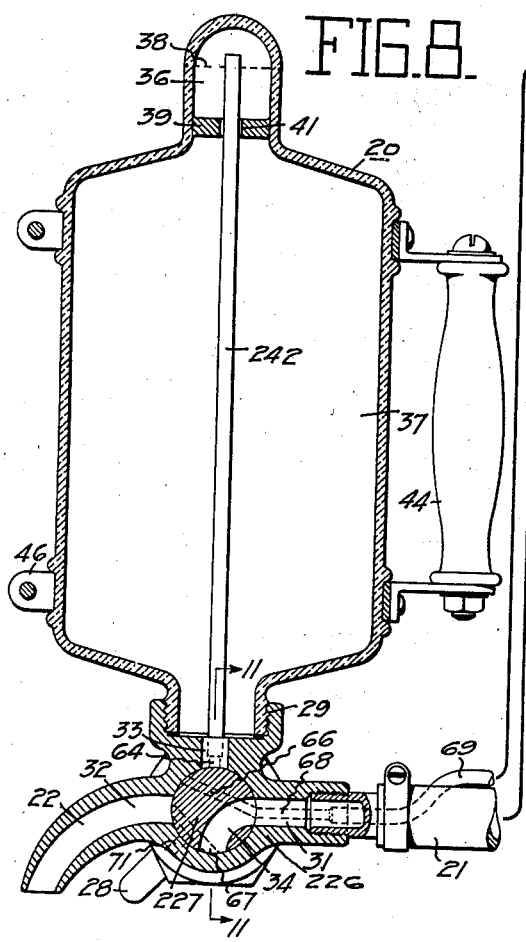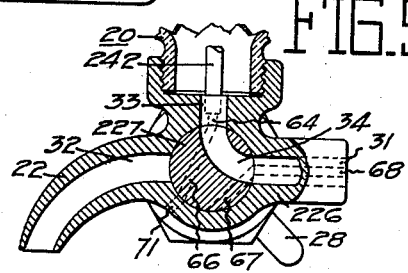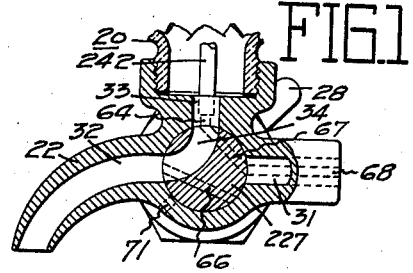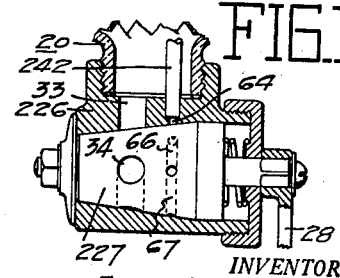

May 22, 1934.   E. J. SWEETLAND   1,959,695
DISPENSING APPARATUS
Filed Dec. 9, 1929   6 Sheets-Sheet 4
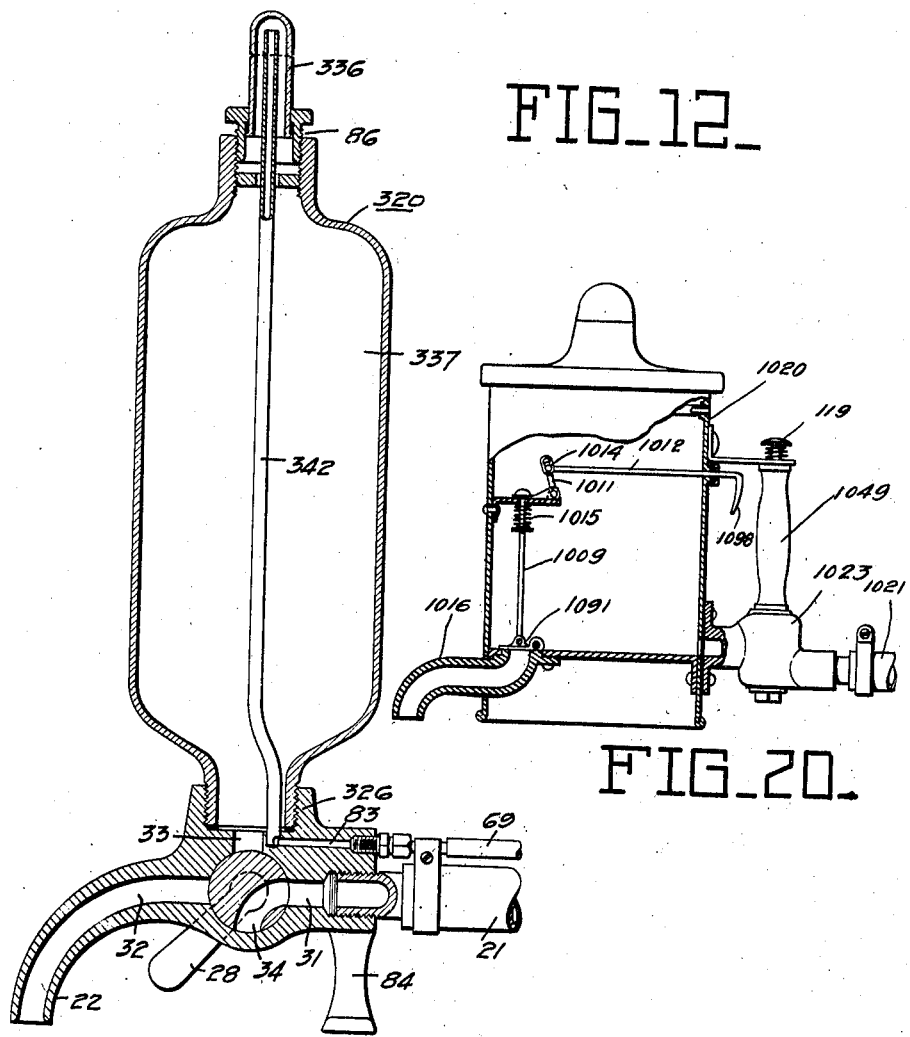
FIG_12_
FIG_20_
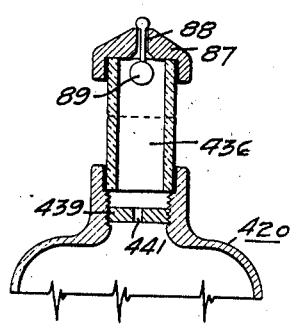
FIG_13_
INVENTOR.
Ernest J. Sweetland
BY
White, Prost, Flehr & Lothrop
ATTORNEYS.

May 22, 1934.    E. J. SWEETLAND    1,959,695
DISPENSING APPARATUS
Filed Dec. 9, 1929    6 Sheets-Sheet 5
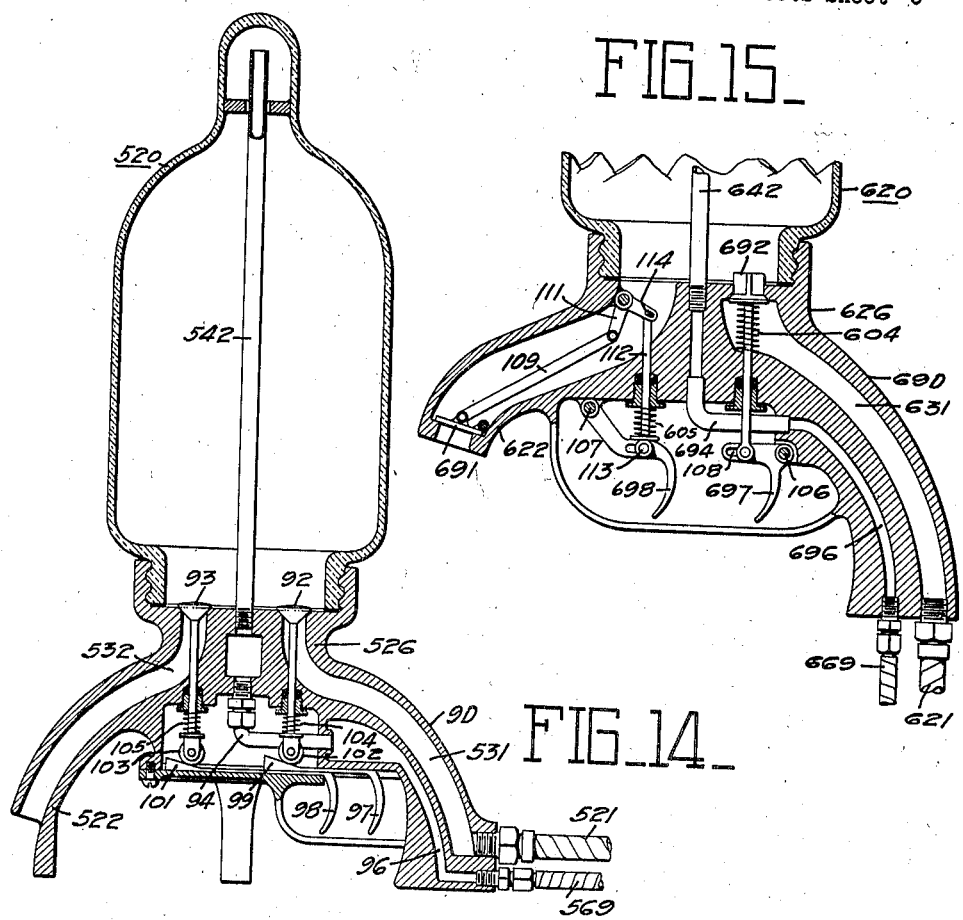
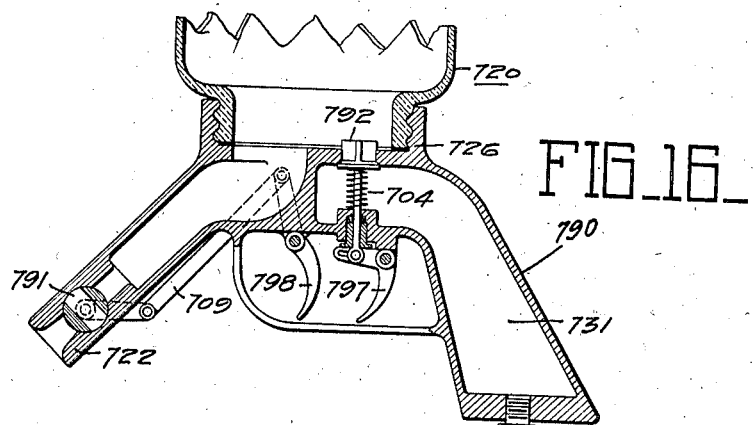
INVENTOR.
Ernest J. Sweetland
BY
ATTORNEYS.

May 22, 1934.  E. J. SWEETLAND  1,959,695
DISPENSING APPARATUS
Filed Dec. 9, 1929  6 Sheets-Sheet 6

INVENTOR.
Ernest J Sweetland
BY White, Prost, Flehr & Lothrop
ATTORNEYS

Patented May 22, 1934

1,959,695

UNITED STATES PATENT OFFICE 1,959,695

DISPENSING APPARATUS

Ernest J. Sweetland, Piedmont, Calif.

Application December 9, 1929, Serial No. 412,744

24 Claims. (Cl. 221—116)

This invention relates generally to apparatus for dispensing or supplying measured quantities of liquid to motor vehicles. It is of particular value for dispensing lubricating oil such as is employed in motor vehicle engines.

In dispensing lubricating oil to automobile or other motor vehicle engines, it is common present day practice to fill an open measuring vessel with the quantity of oil desired, and this vessel is then carried to the automobile engine and permitted to drain into the engine crank case. These measuring vessels are generally of quart size, and if more than one quart is required, the vessel must be repeatedly refilled, or a number of measuring vessels must be drained successively. Dispensing oil in this manner is laborious and inconvenient, and is not conducive to quick service such as is highly desirable for filling stations. Furthermore oil dispensed in open measuring vessels is apt to be contaminated by dirt or foreign material from the air, by material which may be present in the measuring vessels, or by contact with the hands of the filling station attendant. With such methods of handling it is also possible to practice deception, since the purchaser is not clearly apprised of the quantity or character of the oil with which he is being supplied.

It is a general object of the present invention to devise apparatus for dispensing liquids to motor vehicles in a more convenient manner, and which will make possible more rapid and satisfactory service at motor vehicle filling stations. The apparatus herein described can be employed for dispensing oil to motor vehicle engines, or for dispensing water or anti-freezing liquids such as alcohol to motor vehicle radiators.

It is a further object of this invention to devise dispensing apparatus of the above character which will obviate the possibility of the liquid being contaminated with dirt or foreign material.

It is another object of the present invention to devise apparatus which will dispense oil to motor vehicles in such a manner that the purchaser can readily visually determine the quantity and character of the oil with which he is being supplied.

Further objects of the invention will appear from the following description in which the preferred embodiment of the invention has been set forth in detail in conjunction with the accompanying drawings. It is to be understood that the appended claims are to be accorded a range of equivalents consistent with the scope of the prior art.

Referring to the drawings:

Figure 1 is a side elevational view in cross section, illustrating a portable measuring device incorporating certain features of the invention.

Fig. 2 is an end view of the device shown in Fig. 1.

Fig. 3 is a cross sectional detail of a portion of the device shown in Fig. 1, illustrating the valve means in a different operating position.

Fig. 4 is a view partly diagrammatic and partly in perspective, illustrating the manner in which my apparatus can be employed.

Fig. 5 is a side elevational view partly in cross section, illustrating a modified form of my measuring device.

Fig. 6 is a cross sectional detail taken along the line 6—6 of Fig. 5, and illustrating the construction of the valve means in this particular modification.

Fig. 7 is a cross sectional detail of a portion of the measuring container utilized in the dispensing device of Fig. 5, and illustrating a modified form of the means for automatically controlling the rate of inflow of oil.

Fig. 8 is a view, partly diagrammatic, and partly in cross section, illustrating a further modified form of my apparatus.

Figs. 9 and 10 are cross sectional details illustrating different operating positions for the valve means incorporated in the dispensing device shown in Fig. 8.

Fig. 11 is a cross sectional view taken along the line 11—11 of Fig. 8.

Fig. 12 is a side elevational view in cross section, illustrating another modification of my measuring device.

Fig. 13 is a cross sectional detail illustrating a modified construction which can be utilized for the upper portion of the measuring container utilized in the device of Fig. 12.

Fig. 14 is a side elevational view in cross section, illustrating a further modification of my measuring device in which the valve means is controlled by triggers.

Fig. 15 is a cross sectional detail of the lower portion of the device of Fig. 14, but showing a modified construction of valve means.

Fig. 16 is a cross sectional detail similar to Fig. 15, and illustrating another modification of the valve means.

Fig. 20 is a side elevational view, partly in cross section, illustrating a further modification of my apparatus which utilizes a valve for controlling the discharge spout, and also a valve associated with the handle for the measuring container for controlling inflow of liquid.

Figure 17:
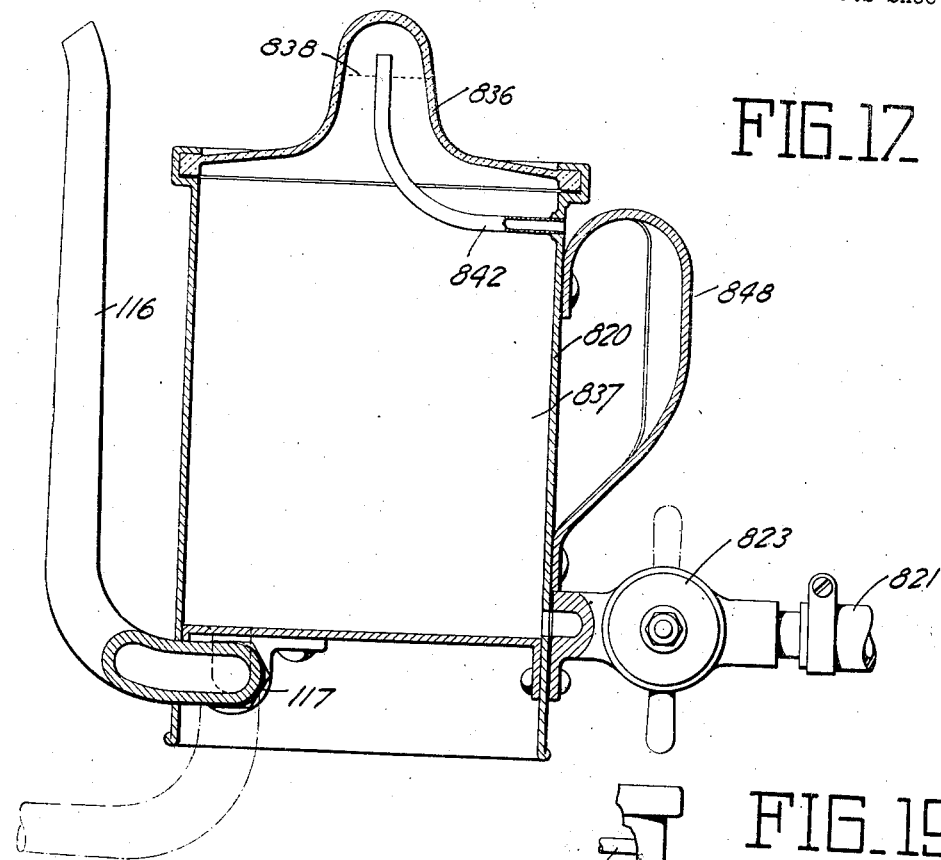
Fig. 17 is a side elevational view, partly in cross-section, illustrating a simplified form of apparatus incorporating the present invention.

My invention can be outlined generally as comprising a portable liquid measuring device which has a flexible connection to a relatively fixed source of liquid supply, such as an oil supply tank or reservoir. Fluid control means are provided in conjunction with the measuring device so that an operator handling the same can control the dispensing of measured quantities of liquid. While I have disclosed herein several novel measuring devices which can be utilized with my apparatus, other types of devices not disclosed can be utilized which are readily portable and which will give fairly accurate measurement of the liquid.

That modification of my measuring device shown in Figs. 1 to 3 inclusive, consists of a measuring container 20, which will hold a predetermined quantity of oil or other liquid, say 1 quart. The lower portion of container 20 is in communication with a relatively fixed source of oil supply thru the flexible hose or pipe 21, and is also in communication with a suitable discharge nozzle 22. For controlling flow of oil into and out of the measuring container 20, I provide valve means 23, which in this particular instance is in the form of a plug valve. This plug valve is formed by a casing or body 26 having a bore within which a rotatable valve plug 27 is disposed. The plug can be rotated to its different operating positions by means of a convenient handle 28. To form a compact unitary structure, container 20 is preferably mounted directly upon valve casing 26, and a direct connection between these parts has been represented by a threaded connection 29. It is also desirable to form discharge nozzle 22 as a part of this structure and therefore it is shown as being integral with casing 26. Port 31 in casing 26 communicates with hose 21 and therefore can be termed an inflow port, while port 32 serves as an outflow and is continued as a passageway for discharge nozzle 22. Another port 33 in valve casing 26 communicates between the lower portion of measuring container 20, and the bore in casing 26.

For controlling flow of oil between the ports in valve casing 26, valve plug 27 is provided with a passageway or port 34. Port 34 is so formed that for the one operating position of plug 27 shown in Fig. 1, communication is established between ports 31 and 33, while for the other operating position of the plug shown in Fig. 3, communication between ports 31 and 33 is interrupted, while communication is established between ports 33 and 32. Assuming therefore that the oil or other liquid supplied to port 31 is under a considerable pressure head, for the operating position shown in Fig. 1 oil will flow from hose 21 into measuring container 20. For the other operating position of the valve shown in Fig. 3, oil cannot flow into the measuring container from hose 21, but oil is free to flow from the container thru ports 33, and 32 to the discharge nozzle 22.

Measuring container 20 is preferably formed so as to indicate the presence of a predetermined quantity of oil within the same. To this end at least a portion of container 20 is made of light transparent material. In that form of the invention shown in Figs. 1 to 3 inclusive, the entire container 20 is made of a suitable glass, or other transparent materials such as pyroxyline or a phenolic condensate product.

As will be presently explained, I preferably provide a fiducial or reference mark upon the container 20, to which the level of oil within the container is permitted to rise in order to secure a predetermined quantity. If such a mark were placed upon a portion of the container having a relatively large cross sectional area, it would be difficult for an operator to secure an accurate measurement. In the device illustrated in Figs. 1 to 3 inclusive, this difficulty is obviated by forming the container 20 in two portions 36 and 37, the upper portion 36 being of relatively small cross sectional area compared to the lower main portion 37. A fiducial mark 38, or equivalent means is then placed upon the upper relatively small portion 36. The two portions of the container are so proportioned that a predetermined quantity of oil is necessary to bring the level to the fiducial mark 38. Because of the relatively small cross sectional area of portion 36, a slight tipping of container 20 to one side or the other, or slight movements of the container while the liquid is being measured, will not greatly affect the level of oil in portion 36, so that an accurate measurement can be made.

Generally the source of liquid connected to hose 21 is such that as the container 20 is being filled with oil, the oil flows into the container at a substantially constant rate. Without the provision of means such as will be presently described, it is apparent that near the end of a filling period the oil level would rise very rapidly in the upper container portion 36, due to its relatively small cross sectional area. Thus it would be difficult for an operator to shut off the inflow of oil at the instant the liquid level reduces the fiducial mark 38. This difficulty can be overcome by the provision of means for automatically decreasing the inflow of oil toward the end of the filling period, or as the oil approaches the fiducial mark 38. A simple form of such means consists of a baffle or diaphragm 39 extending across the upper container portion 36, and provided with an opening 41 forming an orifice thru which the oil must pass. Opening 41 can also accommodate a tube 42, the function of which will be presently explained. During a filling operation, when the level of oil reaches diaphragm 39, the oil must flow thru orifice 41, and the flow resistance offered by this orifice is sufficient to substantially reduce the rate of inflow of oil. Thus the level of oil will rise in container portion 36 at a relatively slow rate, so that the operator can readily cut off the inflow of oil when the level reaches the mark 38.

It is a well known fact that liquid such as oil, with which my apparatus is particularly applicable, tends to pick up dust or dirt from air in which the oil comes in contact. To prevent the oil from picking up dust or foreign material in this manner, and to preclude all contamination of the oil which otherwise might occur, the measuring container 20 is preferably entirely enclosed as shown in Fig. 1. When using such an enclosed container, I preferably provide means for removing and introducing air into the upper portion of the container, corresponding to filling and discharge periods respectively. Thus in Fig. 1 I have shown the tube 42 extending upwardly thru the container and communicating with the upper portion of the container 20 above the fiducial mark 38. The lower portion of this tube is mounted upon valve casing 26, and communicates with a port 43. In this particular instance port 43 is opened to the atmosphere. During a filling period air is discharged from the upper portion of the container thru tube 42, and during a discharge period, air from the atmosphere is drawn into the container thru tube 42, to take the place of the oil being discharged.

To facilitate use of the device described above, I preferably provide a handle 44 which can be readily grasped by an operator. In this instance handle 44 has been shown carried by clamps 46 which surround the container 20.

In Fig. 4 I have illustrated a complete installation of my apparatus, and the manner in which it is used for dispensing oil. The device described with reference to Figs. 1 to 3 inclusive has been indicated generally at A. The valve means 23 is normally closed and prior to the dispensing operation, the container 20 has been filled with a measured quantity of oil. In dispensing the oil the filling station attendant brings the device A into close proximity to the automobile engine, and introduces nozzle 22 into the crank case pipe 47. Valve handle 28 is then turned from closed position to the position shown in Fig. 3, to permit outflow of oil from the container thru nozzle 22 to the engine crank case. One or more additional measured quantities of oil can be introduced into the crank case, by turning the handle 28 to the position shown in Fig. 1, to refill the container 20. In refilling the container the operator interrupts inflow of oil from hose 21 when the oil level reaches mark 38. At some convenient time before the next dispensing operation the container 20 can be refilled so that the apparatus is in readiness for the next dispensing operation. When container 20 is filled to the level indicated by mark 38, the quantity of oil being dispensed is apparent to the purchaser, and the purchaser also has an opportunity to judge the character of the oil. In this connection it may be noted that when oil is in a container of relatively small cross sectional area, its color can be more readily determined. Therefore since the upper portion 36 of my container 20 is of relatively small cross sectional area and is transparent, the color of the oil is made apparent to the purchaser in the same manner as if the oil were viewed thru a small test tube.

The above explanation of the manner in which my apparatus can be employed refers particularly to oil to be supplied to automobile engines, as the dispensing of this liquid involves certain peculiar problems. The invention can also be used with advantage for dispensing water to motor vehicle radiators. At the present time it is customary at filling stations to fill radiators with a common water hose nozzle. Frequently customers desire to know the amount of water required in order to determine if the engine is overheating or the radiator leaking. It is apparent that in place of employing a simple hose nozzle, a measuring device such as is shown in Fig. 1 can be connected to the end of the hose, and the water dispensed in measured quantities, within full view of the customer. Likewise measured quantities of antifreezing solutions such as alcohol can be dispensed to radiators in the same manner.

The relatively fixed source of oil with which my portable measuring device is connected, is preferably a storage tank or reservoir in which the oil is subjected to pneumatic pressure. Such an arrangement is indicated in Fig. 4, in which the oil storage tank 48 is enclosed and has its upper portion connected to an air pressure tank 49. Filter 51 can be inserted between the pressure tank 49 and storage tank 48, to filter the air. This filter can contain a suitable filter medium for removing dirt or foreign material, and can also contain materials such as calcium chloride for removing moisture. A conventional compressor 52 has been indicated for maintaining a proper pneumatic pressure in tank 49. With the oil in tank 48 under a considerable fluid pressure, it is apparent that the oil will flow rapidly into the measuring container 20 thus materially expediting dispensing operations. If desired the pneumatic pressure in tank 48 can be reduced by interposing a suitable reducing valve in the air line.

In Figs. 5 and 6 I have shown a measuring device similar to that described with reference to Figs. 1 to 3 inclusive, but having modified means for introducing and removing air from the upper portion of the measuring container 20. In this case instead of utilizing a port 43 which opens to the atmosphere thru one side of the valve casing 26, I provide a port 53 which communicates between the lower end of tube 42 and the bore within casing 126. Plug 127 is provided with a radial port 54, which communicates with a port 56 extending longitudinally thru the plug 127 and is open to the atmosphere. In that position of the plug shown in full lines in Fig. 5 corresponding to a filling period, ports 53 and 54 are in registry, so that air in the upper portion of container 20 is free to flow down thru tube 42, thru ports 53, 54 and 56 to the atmosphere. For the other operating position of plug 127, port 53 is in registry with another radial port 57 which likewise communicates with longitudinal port 56. Therefore during a discharge period, air can be drawn in thru ports 56, 57, 53 and tube 42 to the upper portion of container 20. When plug 127 is in a closed position in which both inflow and outflow of oil is interrupted, port 53 is out of registry with both ports 54 and 57, thus preventing oil from leaking out thru tube 42 during handling of the device.

In Fig. 7 I have shown a modification of the means for automatically reducing the rate of flow of oil, near the end of the filling period. In this instance diaphragm 39 is provided with another opening 59, which is controlled by a small flap valve 61. Valve 61 has been shown pivotally mounted, and biased as by means of weight 62 to normally take a position in which it substantially closes or seals opening 59. The flap portion of the valve can be made of buoyant material such as cork, so that when the oil level approaches diaphragm 39, closing of this valve is insured. Near the end of a filling operation valve 61 is closed so that the liquid must flow thru orifice 41. However when a discharge period is commenced, the oil may flow from the upper container portion 36, into the lower portion of the container not only thru opening 41 but also thru opening 59, since the differential pressure of the oil is sufficient to open valve 61. By means of this small valve, I am therefore enabled to more quickly discharge the contents of the measuring container 20, since during the initial part of the discharge period flow of oil out of the measuring container is not unduly retarded by the opening 41.

In the above described forms of my invention, the oil flows out of the measuring container 20 thru the discharge nozzle 22 by gravity. In that form of the invention illustrated in Figs. 8 to 11 inclusive, I utilize means in addition to the gravity head which may be present, for accelerating discharge of oil from the measuring container 20. The specific means which I have disclosed places the fluid within the measuring container 20 under a fluid pressure substantially greater than atmospheric during a discharge period. Thus in this instance tube 242 communicates with a port 64, which is adapted to selectively register with ports 66 and 67 in the valve plug 227. Another port 68 is provided in the valve casing, which is connected to a source of air or other compressible fluid under pressure, by means of a flexible hose or pipe 69. When the valve handle 28 is in the position shown in Fig. 8, no liquid can flow from hose 21 into the measuring container, and no air can be discharged from pipe 69. For filling the container with a measured quantity of liquid, the valve handle is turned to the position shown in Fig. 9, in which the valve port 34 registers with ports 31 and 33, so that liquid is free to flow into the container. It will also be noted that at this time port 66 registers with port 64, and is also in communication with the atmosphere thru a port 71. Therefore during a refilling operation, air from the upper portion of the measuring container is vented to the atmosphere. When the valve handle 28 is turned to the position shown in Fig. 10, valve plug port 34 registers with ports 32 and 33, thus permitting the liquid in the measuring container to discharge thru the nozzle 22. At the same time port 67 registers with ports 64 and 68, thus permitting compressed air or other expansible fluid to be introduced into the upper portion of the container from pipe 69. The oil within the container will therefore be subjected to fluid pressure substantially greater than atmospheric, to materially accelerate outflow of oil. This provision of means for accelerating the outflow of oil materially reduces the time required for a dispensing operation, particularly when the liquids being dispensed are relatively viscous, such as comparatively heavy lubricating oils.

Fig. 8 also diagrammatically illustrates suitable apparatus for supplying oil and compressed air to the measuring device shown in this figure. This apparatus includes a relatively high pressure pneumatic tank 72, connected to a conventional compressor 73. Pipe 74 connects tank 72 with an air filter 76, which in turn is connected to a low pressure storage tank 77 thru a suitable pressure reducing valve 78. Filter 76 can contain material like calcium chloride to remove moisture from the air, thus precluding the possibility of introducing water condensate with the oil. Pipe 81 connects tank 77 to the pneumatic pipe 69, thru another reducing valve 82. By means of this apparatus a pressure of say 5 lbs. per square inch can be placed upon the liquid in tank 48, while a reduced pneumatic pressure of say 2 lbs. per square inch can be introduced into pipe 69. The pressure with which the air and oil can be supplied to the measuring device can of course vary to suit different conditions. A supplemental low pressure air tank may be introduced in pipe 60 between reducing valve 82 and the dispensing apparatus if desired.

In Fig. 12 I have shown a further modification of my measuring device in which the liquid is placed under a fluid pressure greater than atmospheric during a discharge period, but in which the pneumatic pressure is not automatically controlled by the valve which controls introduction and discharge of oil. Thus in this case tube 342 communicates with port 83, which is in direct communication with the pneumatic supply pipe 69. Otherwise the valve casing 326 and its associated valve member are constructed similar to the corresponding parts shown in Fig. 1. One or more supporting legs 84 can extend from valve casing 326, to facilitate supporting the device between dispensing operations. In operating the device of Fig. 12, pipe 69 is connected to a source of pneumatic pressure substantially greater than atmospheric, but substantially less than the pressure with which oil can be introduced thru hose 21. Thus when the valve handle 28 is turned from the closed position shown in Fig. 12 to a position in which port 34 registers with ports 31 and 33, oil flows into the measuring container 320 against the pneumatic pressure present within the container by virtue of communication with pipe 69, and the air within the container displaced by the oil is forced back into the lower pressure pneumatic tank or other source of pneumatic pressure. After a measured quantity of oil has been introduced into the measuring container, valve handle 28 is turned to a position in which port 34 registers with ports 33 and 32, and then the oil discharges thru nozzle 22, not only by virtue of the gravity head, but also because of the pneumatic pressure upon the surface of the liquid. Thus with this device, as is also the case with the device of Figs. 8 to 11 inclusive, oil can be rapidly introduced and discharged from the measuring container.

A modification of the measuring container 320 has been shown in Fig. 12, in which only a part of the container is made of transparent material. Thus the lower container portion 337 is made of a suitable metal, such as aluminum, while the upper container portion 336 is formed as a separate member made of a transparent material such as a suitable glass, pyroxyline, or a phenolic condensate product. A suitable coupling 86 serves to seal and establish communication between the container portions 336 and 337. By means of a container constructed in this manner, the container can have considerable structural strength, and at the same time have the advantages of visual indication and visual determination of the character of the oil being dispensed.

With respect to that form of the measuring device shown in Fig. 1, it is possible to dispense with the tube 42 and provide other means for permitting the introduction and discharge of air from the upper portion of the measuring container. Thus in Fig. 13, I have shown a measuring container 420 corresponding to the measuring container 20 of Fig. 1, which however is of construction similar to that described with reference to Fig. 12. The upper transparent container portion 436 is made in the form of a tube, having an upper closure member or cap 87. Cap 87 is provided with an aperture or vent 88 to the atmosphere, and a small check valve provided with a lower float ball 89, is disposed within this aperture. Diaphragm 439 corresponds to the diaphragm 39 of Fig. 1, and is likewise provided with a restricted opening or orifice 441. During filling and discharge operations, air can be discharged or drawn into the measuring container thru opening 88, and in the event that the oil level rises too high in container portion 436, float 89 is raised to close the opening 88.

In Fig. 14 I have shown a measuring device which can be operated by one or more triggers, in place of the operating handle 28 of the forms previously described. Thus in this instance the valve casing 526 is provided with a portion 90 formed to simulate a pistol grip and is also provided with a pair of poppet valves 92 and 93. Poppet valve 92 controls flow of liquid into the measuring container 520 from flexible hose 521 and the passageway 531. Poppet valve 93 controls discharge of oil from the measuring container thru discharge passageway 532 and the discharge nozzle 522. Tube 542 corresponding to the tube 342 of Fig. 12, connects with a tube 94, which in turn communicates with flexible pneumatic supply pipe 569, by way of passageway 96. Triggers 97 and 98 are slidably mounted upon the valve casing 526, and carry cam members 99 and 101. These cam members are adapted to engage rollers 102 and 103 secured to the lower ends of the movable members of valves 92 and 93 respectively. Poppet valves 92 and 93 are normally biased toward closed position, by means of compression springs 104 and 105 respectively.

The operation of the device of Fig. 14 is similar to that described with reference to Fig. 12. In dispensing liquid, the operator grasps grip 90, and trigger 97 is then pulled to open poppet valve 92 and permit the oil to flow into the measuring container 520. When the container has received a predetermined quantity of oil, trigger 97 is released to permit poppet valve 92 to close under the bias of spring 104, and trigger 98 is then pulled to open poppet valve 93 and permit the liquid to be discharged thru nozzle 522.

That form of measuring device shown in Fig. 15 is somewhat similar to that of Fig. 14, in that triggers are also employed for operating the valve means. In this case the portion 690 of the valve casing is also formed to simulate a pistol grip, and operating triggers 697 and 698 are pivotally connected to the valve casing by means of pivot pins 106 and 107. The stem of poppet valve 692 has a pin and slot connection 108, with trigger 697. Compression spring 604 serves to normally urge poppet valve 692 towards closed position. Instead of utilizing a poppet valve like that indicated at 93 in Fig. 14, I have shown a butterfly or flap valve 691, mounted at the end of the discharge nozzle 622. Link 109 serves to connect the flap of valve 691, with a pivotally mounted L-lever 111. A rod 112 has its lower end provided with a pin and slot connection 113 with trigger 698, and its other end has a pin and slot connection 114 with one arm of L-lever 111. Compression spring 605 serves to normally bias valve 691 towards closed position. Tube 642 is in communication with the pneumatic pressure pipe 669 thru tube 694 and passageway 696. The operation of this device is substantially the same as that of Fig. 14. By pulling trigger 697 the operator opens poppet valve 692 and permits fluid from hose 621 to fill the measuring container 620. When the required quantity of liquid has been introduced into the measuring container, trigger 698 is pulled to open the flap valve 691, thus permitting the discharge of oil from the measuring container.

In Fig. 16 a simplified form of measuring device has been shown which operates somewhat similar to the device illustrated in Fig. 1. In this case the portion 790 of the casing is formed to simulate a pistol grip, and the passageway 731 within this grip is connected to the liquid supply hose 721. Communication between passageway 731 and the lower portion of the measuring container 720, is controlled by poppet valve 792, adapted to be actuated by trigger 797. Valve 792 is normally biased toward closed position by compression spring 704. A conventional plug valve 791 is shown mounted in the end of the discharge nozzle 722. The operating arm of this plug valve is connected to an arm extending from trigger 798 by means of link 709. With the device as shown in this figure the liquid is not subjected to a pressure greater than atmospheric during its discharge. The operator pulls trigger 797 to fill the measuring container 720, and then this trigger is released and trigger 798 pulled to open valve 791 and permit the discharge of liquid. In this modification it is apparent that air can be vented and introduced into the upper portion of the measuring container by means of a tube similar to the tube 42 of Fig. 1, which can communicate with the atmosphere thru the casing 726.

A further modification of my measuring device is shown in Fig. 17, which is of greater simplicity than the forms previously described. In this case the upper portion 836 of the measuring container 820 is dome shaped and made of transparent material such as glass, pyroxyline or a phenolic condensate product, while the lower larger portion 837 is made of metal. A suitable handle 848 is secured to the metal portion 837. The hose 821, which connects to the source of oil, communicates with the lower portion of container 820, thru a suitable valve 823. For discharging oil from the container I provide a spout or discharge nozzle 116 formed of a pipe having a hinged coupling connection 117 with the lower portion of the container 820. For venting and introducing air in the upper portion of the measuring container, I provide a tube 842 having its upper end communicating with and terminating in the upper part of container portion 836, and having its other end extended thru one side of the lower container portion 837, and thus communicating with the atmosphere.

In filling the measuring container of the device shown in Fig. 17, the operator opens valve 823 and permits the oil to flow into the measuring container. During this filling period, spout 116 is in raised position as shown in dotted lines in Fig. 17. After the level of the oil reaches mark 838 valve 823 is closed, and then the oil can be dispensed by swinging spout 116 downwardly and introducing the same into the pipe leading to the motor vehicle engine crank case. It is evident that this form of my invention obviates the necessity of providing valve means controlling both the inflow and outflow of oil.

Figure 18:
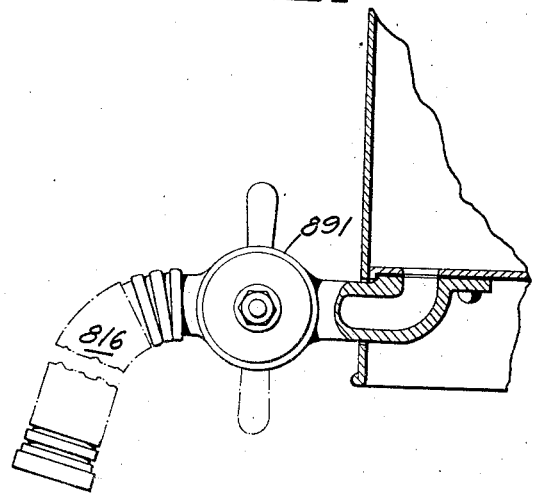
Fig. 18 is a detail, partly in cross section, illustrating the manner in which the modification of Fig. 17 can be altered by utilizing a valve controlled discharge spout, in place of the swinging spout of Fig. 17.

That form of measuring device shown in Fig. 17 can also be modified by providing a valve in addition to valve 823, for controlling the discharge of oil from the measuring container. Such a modification is illustrated in Fig. 18 in which I have shown a simple valve 891 connecting between the lower portion of the measuring container and the discharge pipe 816. When this modification is employed it is evident that the operator must have valve 891 closed while valve 823 is open, to permit filling of the measuring container, and when the oil is dispensed valve 823 remains closed while valve 891 is open.

Figure 19:
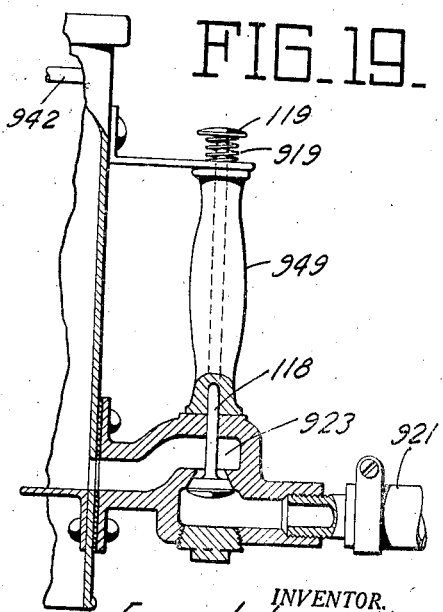
Fig. 19 is a detail, partly in cross section, showing the manner in which valve means can be incorporated in conjunction with a handle for the measuring container, in place of the valve means of Fig. 17 for controlling inflow of liquid into the measuring container.

It is also possible to employ different types of valves other than the simple form of valve 823 shown in Fig. 17. Thus as shown in Fig. 19, a poppet or globe valve 923 is employed for controlling flow of oil into the container from hose 921. The operating rod or stem 118 of poppet valve 923 is extended upwardly thru the handle 949 and is provided at its upper end with a convenient button 119 to be depressed by the operator. Compression spring 919 is provided for normally biasing valve 923 toward closed position. In operating this device the operator can grasp handle 949 with his fingers, and employ his thumb for operating the valve 923.

In Fig. 20 there is shown another modified measuring device of the general type illustrated in Figs. 17 to 19 inclusive. In this case flow of oil into the measuring container 1020 is controlled by a valve 1023 similar to the valve 923 of Fig. 19. Flow of oil thru the discharge nozzle or spout 1016 is controlled by suitable valve means such as the flap valve 1091. Operation of the flap valve 1091 is effected thru a trigger 1098 located adjacent the upper portion of handle 1049 so that it can be conveniently engaged by the operator's finger. A mechanical connection is effected between trigger 1098 and valve 1091, by mounting the trigger upon a rod 1012 which slidably extends into the measuring container. A depending rod or link 1009 has its lower end pivotally connected to valve 1091, and has its upper end connected to one arm of an L-lever 1011. The other arm of lever 1011 has a pin and slot connection 1014 with the inner end of rod 1012. A compression spring 1015 serves to normally bias valve 1091 towards closed position. With this modification valves control both inflow and outflow of oil, but both valves can be controlled by the same hand with which the operator is supporting or steadying the device.

I claim:

1. In a dispensing apparatus for liquids, a measuring container adapted to receive liquid, means for separately introducing and for withdrawing a measured volume of liquid from the lower portion of the container, said container having an upper transparent portion of substantially smaller cross sectional area than the lower portion of the container, and a restricted orifice serving to restrict communication between the upper and lower portions of the container, said orifice serving as means to automatically reduce the rate of flow of liquid into the container as the liquid in the container approaches a predetermined volume.

2. In a dispensing apparatus for liquids, a measuring container adapted to receive liquid, means for separately introducing and for withdrawing a measured volume of liquid from the lower portion of the container, said container having an upper closed transparent portion of substantialy smaller cross sectional area than the cross sectional area of the lower portion of the container, a restricted orifice serving to restrict communication between the upper and lower portions of the container, and a fiducial mark on the upper portion of the container above said orifice.

3. In a dispensing apparatus, a measuring container adapted to receive liquid and to discharge the same, said container being formed of a lower main section and an upper closed section of transparent material, said upper section being of substantially smaller sectional area than the lower section, and a vent passage having an upper end communicating with the interior of the upper section and having a lower end leading to a source of gas at not less than atmospheric pressure.

4. In a dispensing apparatus, a measuring container adapted to receive liquid and to discharge the same, said container being formed of a lower main section and an upper closed section of transparent material, said upper section being of substantially smaller sectional area than the lower section, and a passage having an upper inlet end communicating with the interior of the upper section at a level above said fiducial mark and having a lower end leading to the exterior of the container at a point below the level of said fiducial mark and to a source of gas at not less than atmospheric pressure.

5. In a dispensing apparatus, a measuring container adapted to receive liquid and to discharge the same, said container being formed of a lower main section and an upper closed dome-like section of transparent material, said upper section being of substantially smaller sectional area than the lower section, a fiducial mark upon the upper section, and a tube extending upward within the upper section, said tube having its upper end terminating at a level which is not below said fiducial mark and having its other end open to the atmosphere at a point below the level of the fiducial mark and exterior of the casing.

6. In a dispensing apparatus, a measuring container having provision for introducing and discharging measured quantities of liquid therefrom, said container having an upper closed portion, and a tube having its one end extending into said upper portion and communicating therewith, the lower end of said tube communicating with the exterior of the container thru a wall thereof.

7. In a dispensing apparatus for liquids, a measuring container adapted to receive liquid, means for separately introducing and for withdrawing a measured volume of liquid from the lower portion of the container, this container having an upper closed transparent portion of substantially smaller cross sectional area than the cross sectional area of the lower portion of the container, a restricted orifice serving to restrict communication between the upper and lower portions of the container, a fiducial mark on the upper portion of the container above said orifice and a fluid passage having its upper end communicating with the interior of said transparent portion above said orifice and having its lower end communicating with the exterior of the container.

8. A portable liquid dispensing device comprising a portable measuring container formed with a lower main section terminating in an upper section of substantially smaller cross section than the lower section, said upper section being of transparent material and having a fiducial mark thereon, a tube leading to said upper section and communicating therewith at a point above said fiducial mark, a flexible conduit adapted to connect the lower portion of the container with a source of liquid to be dispensed, valve means adjacent the container and serving to control communication between said conduit and said container, and another flexible conduit adapted to connect said tube with a source of gas above atmospheric pressure.

9. A portable liquid dispensing apparatus comprising a measuring container, a discharge spout connected to the lower portion of the container, a hollow bracket secured to the container and having its interior communicating with the container, a handle secured to the hollow bracket, a conduit for introducing fluid to be measured into the container thru said bracket and a valve carried by said bracket for controlling flow of liquid thru the same.

10. A portable liquid dispensing apparatus comprising a measuring container, a discharge spout connected to the lower portion of the container, a hollow bracket secured to the container and having its interior communicating with the container, a handle secured to the hollow bracket, a conduit for introducing liquid to be measured into the container thru said bracket, a valve carried by said bracket for controlling flow of liquid thru the same, and a valve operating stem extending thru said handle.

11. A liquid dispensing device comprising a portable container having a closed upper portion, a valve structure adjacent the bottom of the container, an air tube having one end thereof connected to a port in said valve structure and another end thereof extending upwardly to a point within the upper portion of the container, and a liquid carrying conduit connected to said valve structure, said valve structure serving to control flow of liquid from said conduit to said container.

12. A liquid dispensing apparatus comprising a portable container having a closed top portion, an air tube having its one end communicating with the upper portion of the container, the other end of said tube communicating with a source of air at not less than atmospheric pressure, and a three-way valve associated with said container and in communication therewith, said valve having one operating position in which liquid measured in the container is permitted to discharge, and another operating position in which discharge of liquid is interrupted and the container placed in communication with a source of liquid to be dispensed.

13. A portable apparatus for measuring liquids comprising a vessel having a transparent dome forming an enclosed upper cavity of smaller cross-sectional area than the main body of said vessel, an air vent conduit leading from a point within said cavity to a lower point external to said vessel, and a liquid discharge spout connected to the lower part of said vessel, said vessel having a liquid inlet opening at a point below said enclosed upper cavity.

14. In a liquid dispensing device, a container having a body portion to contain a specific measured volume of liquid, said body portion being made of transparent material and having an upper transparent portion therefore terminating in a dome of substantially smaller diameter than the body portion of said container, a base portion for said container, a drainage spout and an inlet opening communicating through said base portion with said container, the body portion of said container having no communication with the outer atmosphere except through a vent leading upwardly from the outer atmosphere to a point adjacent the uppermost portion of said dome.

15. In a liquid dispensing device, a vessel provided with an inlet and an outlet opening, said vessel having a transparent dome at the upper extremity thereof, said dome being completely enclosed except for a vent forming communication between the upper portion of said dome and the outer atmosphere, an apertured diaphragm forming a partition between said dome and the main body of said vessel and valve means for regulating flow of liquid thru said diaphragm.

16. In a liquid measuring and dispensing device, a transparent vessel having an opening at the base thereof, the extreme upper portion of said vessel being extended to form an enclosing transparent dome of substantially smaller diameter than the body portion of said vessel, a fiducial mark on said dome to indicate a definite measured quantity of the liquid, means forming an air vent communicating between the interior of said dome at a point above said fiducial mark and the outer atmosphere, and a base portion to said vessel having liquid inflow and outflow openings.

17. In a liquid measuring and dispensing device, a transparent vessel with an enclosed upper portion extended to form a dome of substantially smaller diameter than the body portion of said vessel, the lower portion of said vessel terminating in a threaded neck, a base portion threaded to receive said neck, an inlet and outlet connection to said base portion, and means associated with the dome to indicate a definite volume of liquid within said vessel, there being a vent forming communication between the interior of said dome and the outer atmosphere at a point above said last mentioned means.

18. In a liquid dispensing device, a vessel having an inlet opening and having a drain spout communicating with its lower portion, said vessel having a dome of transparent material at the top thereof, said dome being of substantially smaller diameter than the body portion of said vessel, there being an air vent forming communication between the upper portion of said dome and the atmosphere.

19. A portable liquid dispensing apparatus comprising a measuring container, said container having an upper enclosed portion of smaller sectional area than the body of said container and of transparent material, an air vent forming communication between said upper enclosed portion and the outer atmosphere, a perforate diaphragm between said upper enclosed portion and the body of said container, a flexible conduit for introducing a fluid to be measured into the body of said container, a valve associated with said conduit and adjacent to said container, and a drainage opening communicating with the body of said container at a point near the bottom thereof.

20. A portable liquid dispensing apparatus comprising a measuring container, said container having an upper enclosed portion of smaller sectional area than the body of said container and of transparent material, an air vent forming communication between said upper enclosed portion and the outer atmosphere, a perforate diaphragm between said upper enclosed portion and the body of said container, fluid operated valve means for controlling flow of liquid thru said diaphragm, a flexible conduit for introducing a fluid to be measured into the body of said container, a valve associated with said conduit and adjacent to said container, and a drainage opening communicating with the body of said container at a point near the bottom thereof.

21. In a liquid measuring and dispensing device, a transparent vessel with an enclosed upper portion extended to form a transparent dome of substantially smaller diameter than the body portion of the vessel, a base portion secured to the lower portion of the vessel, an inlet and an outlet connection to said base portion, and means associated with the dome to indicate a definite volume of liquid within said vessel, there being a vent forming communication between the interior of said dome and the outer atmosphere at a point above said last mentioned means.

22. A portable liquid dispensing and measuring apparatus comprising a measuring container, said container having a body portion and a transparent upper enclosed portion of smaller sectional area than said body portion, a duct forming communication between said upper enclosed portion at a point exterior of said measuring container, a diaphragm between said upper enclosed portion and said body portion, said diaphragm having an aperture to provide restricted communication between said body portion and said upper enclosed portion, and an inlet and an outlet for liquid communicating with the body portion of said apparatus.

23. In a liquid measuring and dispensing device, a transparent vessel having an opening at the base thereof, the extreme upper portion of said vessel being extended to form an enclosing transparent dome of substantially smaller diameter than the base portion of said vessel, means associated with said dome to indicate a definite measured quantity of the liquid, means forming an air vent communicating between the interior of said dome at a point above said indicating means and the outer atmosphere, and means forming liquid inflow and outflow openings communicating with the body portion of the vessel.

24. A portable liquid dispensing apparatus comprising a measuring container, said container having an upper enclosed portion of smaller sectional area than the body portion of said container and of transparent material, an air vent forming communication between said upper enclosed portion and the outer atmosphere, means for introducing a liquid to be measured into the body of said container, and a liquid drainage opening communicating with the body of said container at a point near the bottom thereof.

ERNEST J. SWEETLAND.